United States Patent [19]
Nay et al.

[11] Patent Number: 4,878,197
[45] Date of Patent: Oct. 31, 1989

[54] DATA COMMUNICATION APPARATUS

[75] Inventors: Daniel L. Nay, Rancho Palos Verdes; Darryl K. Korn, Laguna Beach; John T. Ralph, Mission Viejo, all of Calif.

[73] Assignee: Control Data Corporation, Minneapolis, Minn.

[21] Appl. No.: 85,812

[22] Filed: Aug. 17, 1987

[51] Int. Cl.⁴ .......................... G06F 15/16; H04J 3/00
[52] U.S. Cl. .................................................... 364/900
[58] Field of Search ... 364/200 MS File, 900 MS File; 340/825.5; 370/84

[56] References Cited

U.S. PATENT DOCUMENTS

| | | | |
|---|---|---|---|
| 4,143,418 | 3/1979 | Hodge et al. | 364/200 |
| 4,161,778 | 7/1979 | Getson et al. | 364/200 |
| 4,164,787 | 8/1979 | Aranguren | 364/200 |
| 4,214,305 | 7/1980 | Tokita et al. | 364/200 |
| 4,323,482 | 12/1983 | Hargrove et al. | 364/200 |
| 4,374,428 | 2/1983 | Barnes | 364/900 |
| 4,443,846 | 4/1984 | Adcock | 364/200 |
| 4,443,864 | 4/1984 | McElroy | 364/900 |
| 4,447,878 | 5/1984 | Kinnie et al. | 364/200 |
| 4,499,576 | 2/1985 | Fraser | 370/94 |
| 4,507,760 | 3/1985 | Fraser | 365/221 |
| 4,625,307 | 11/1986 | Tulpule et al. | 370/85 |
| 4,628,477 | 12/1986 | Burrows | 364/900 |
| 4,639,860 | 1/1987 | Peters | 364/200 |
| 4,649,511 | 3/1987 | Gdula | 364/900 |
| 4,695,948 | 9/1987 | Blevins et al. | 364/200 |
| 4,698,753 | 10/1987 | Hubbins et al. | 364/200 |
| 4,715,030 | 12/1987 | Koch et al. | 340/825.5 |
| 4,769,769 | 9/1988 | Bolt et al. | 364/200 |
| 4,780,812 | 10/1988 | Freestone et al. | 364/200 |

FOREIGN PATENT DOCUMENTS

| | | |
|---|---|---|
| 0016357 | 1/1986 | Japan . |
| 0051256 | 3/1986 | Japan . |
| 0062158 | 3/1986 | Japan . |
| 0094142 | 5/1986 | Japan . |
| 0098469 | 5/1986 | Japan . |

Primary Examiner—Andrew J. James
Assistant Examiner—Viet Nguyen
Attorney, Agent, or Firm—Joseph A. Genovese; Robert M. Angus

[57] ABSTRACT

A data communications apparatus transfers data between two channels, the data formats of each being incompatible with the other. Index registers receive index addresses from each channel to access a pointer in a pointer RAM. The pointer addresses a data location in a data RAM to permit data to be stored or read from either channel at the data transfer rate and byte size for that channel. Registers are provided between each RAM and at least one of the channels to concatenate smaller byte words for transfer between the RAMs and the one channel. Counter apparatus drives the pointer RAM to access successive locations in the data RAM, as desired.

18 Claims, 1 Drawing Sheet

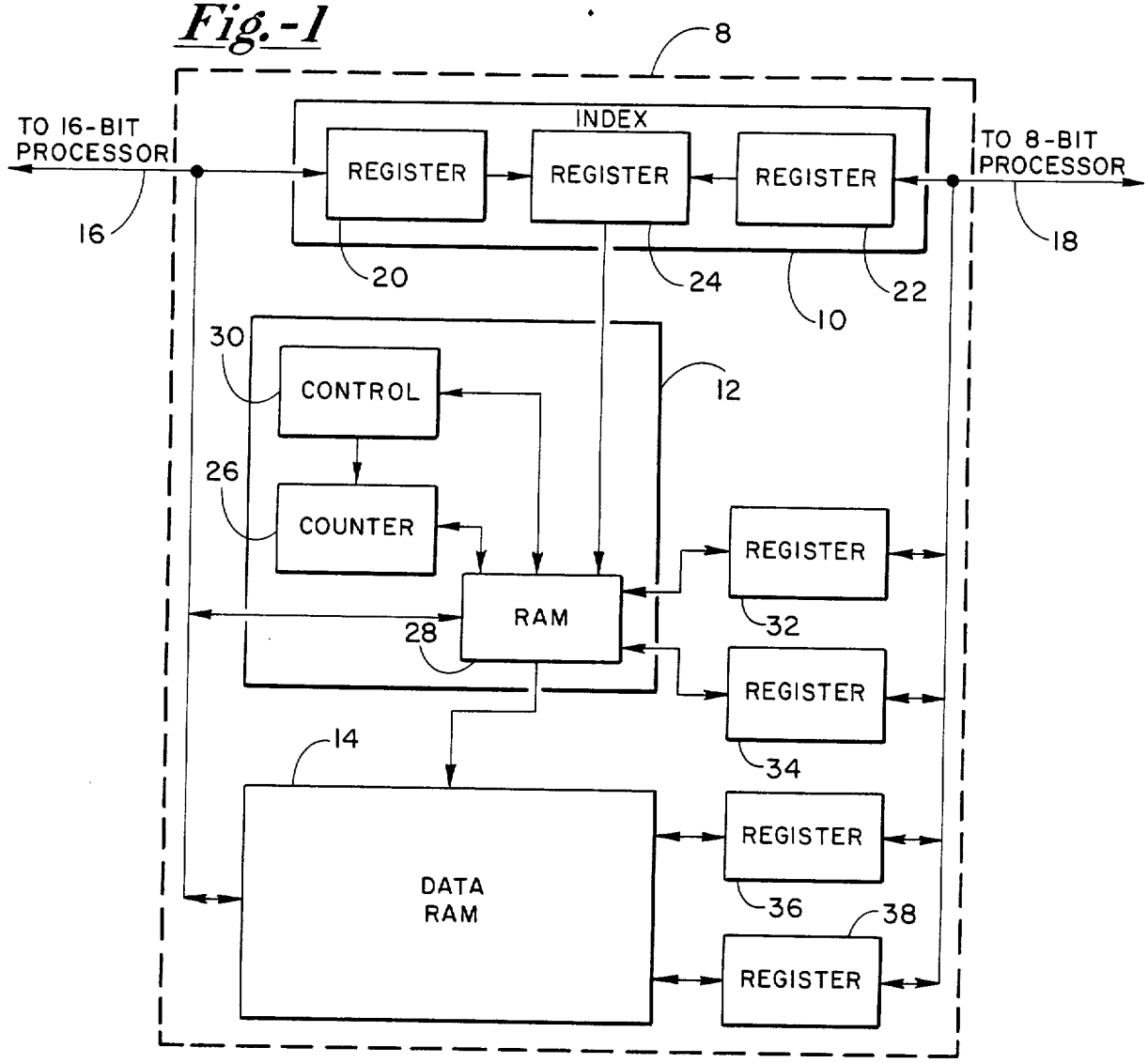
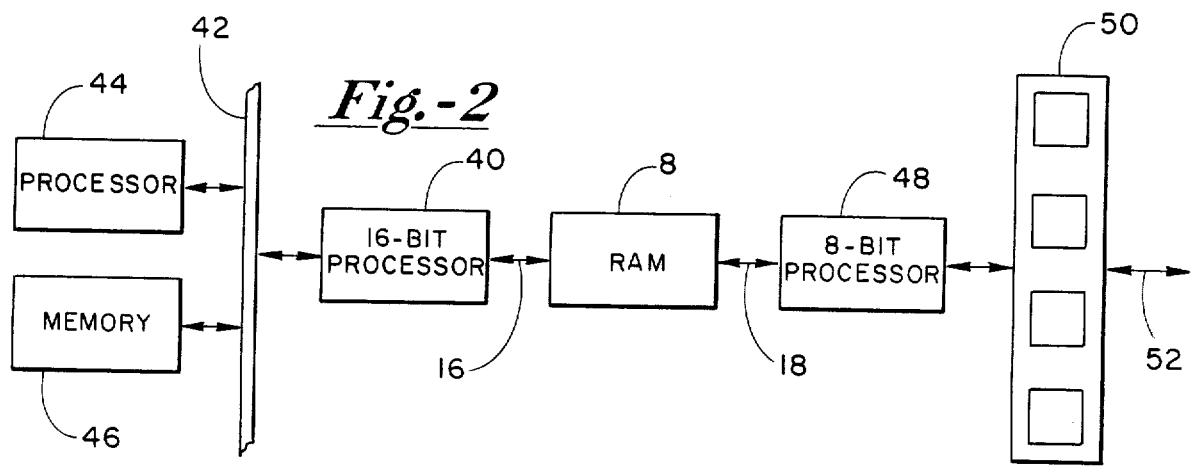

DATA COMMUNICATION APPARATUS

BACKGROUND OF THE INVENTION

This invention relates to communication apparatus, and particularly to apparatus for transferring data between first and second channels where the data format (byte size or frequency) on one channel is incompatible with the data format on the other channel.

In communication apparatus for transmitting data of one byte size to another (such as 8-bit to 16-bit words, and vice versa) or at different speeds (for example, 8 MHz to 4 MHz, and vice versa) it is common to employ a first-in, first-out (FIFO) register so that words of one type are sequentially stored in the register in the size and at the frequency of the sending apparatus, and are read out in sequence at the size and frequency of the receiving apparatus. However, such apparatus has not been altogether effective in handling complex communications, such as communications between a large plurality of terminals and/or processors. The present invention, therefore, is directed to a more sophisticated device having the appearance of a first-in, first-out apparatus, yet is capable of handling the complexity of a large data communication network.

SUMMARY OF THE INVENTION

In accordance with the present invention, a random access memory is provided having an index register for accepting index addresses from both channels, The index register provides an index address for accessing a first random access memory (pointer RAM) operating separately in read and write modes. The first random access memory is a RAM containing a plurality of pointers which provide addresses for a second random access memory (data RAM). A counter automatically increments the pointers in the pointer RAM at the conclusion of each access, when requested, to reach successive locations in the data RAM. The data RAM is connected to both channels to store and retrieve data at the locations selected by the pointer RAM.

One feature of the invention resides in the inclusion of registers in the data RAM connected to the channel handling the data with the smaller bytes to format data to and from the data RAM to be compatible with the smaller byte size of that channel.

Another feature of the present invention resides in the connection of the pointer RAM to both channels to permit direct loading of data addresses to and from the pointer RAM to permit direct read/write access to any pointer from either channel. Registers in the pointer RAM are connected to the channel handling addresses/data with smaller bytes to format addresses to the pointer RAM to be compatible with the pointer RAM size.

Employing the apparatus in a communication network, it is possible to transfer data in bytes at varying speeds and size in both directions without impacting operation of either side. Furthermore, through the use of the pointer RAM and counter, the RAM network appears to both sides as a plurality of independent first-in, first-out apparatus, yet the apparatus coordinates the message transfer to utilize the maximum capability of both sides of the system.

BRIEF DESCRIPTION OF THE DRAWINGS

The above and other features of this invention will be more fully understood from the following detailed description, and the accompanying drawings, in which:

FIG. 1 is a block circuit diagram of a random access memory system in accordance with the presently preferred embodiment of the present invention; and FIG. 2 is a block diagram of a communication network employing the random access memory in FIG. 1 in accordance with the present invention.

DESCRIPTION OF THE PREFERRED EMBODIMENT

FIG. 1 illustrates a Random Access Memory (RAM) 8 in accordance with the presently preferred embodiment of the present invention. RAM 8 includes index apparatus 10, pointer RAM 12 and data RAM 14, each connected on one side 16 to a microprocessor 40 (FIG. 2) which controls a 16-bit data bus at a data rate of 8 MHz (125 microseconds), and another side 18 to an 8-bit data processor 48 (FIG. 2) operating at a transfer rate of 4 MHz (250 microseconds) to transfer data in bytes to a line interface. The index apparatus includes a first register 20 connected to the 16-bit input line 16, a second register 22 connected to the 8-bit input line 18, and a third register 24 connected between the registers 20 and 22. An index address input into one or the other of registers 20, 22 is held until commanded to process one or the other inputs. Index apparatus 10 includes a priority scheme to grant priority to register 22 in case of simultaneous access requests. A retry scheme is also included to permit the 16 bit processor to repeat an operation.

Assume index address "3C" has been inputted to index 10 from the 16-bit data bus on line 16. Address "3C" is held in register 20 until the index 10 is idle and register 20 is commanded to transfer the index address to register 24. The index address is transferred to register 24. At the next clock pulse following loading into RAM 12, the index address is inputted to pointer RAM 12 to locate a pointer address at the location corresponding to the index address "3C". For example, if pointer RAM 12 contains the pointer address "1F26" at location "3C", pointer RAM 12 will access the pointer address "1F26". Pointer address "1F26" addresses RAM 14 so that data at location "1F26" in RAM 14 may be made available for read out onto bus 16, or data on bus 16 may be written in the RAM 14 at location "1F26", as the case may be.

Assume data is being written into data RAM 14 at a location commencing at RAM address "1F26". Assume further that index address "3C" corresponds in the pointer RAM to data RAM address "1F26". Index address "3C" addresses pointer RAM 12 to access address "1F26" in the data RAM 14 as described. Pointer RAM 12 includes a 256 by 16-bit RAM 28 and a counter 26. In the preferred embodiment, the lower 8 bits of successive lines in the pointer address in RAM 28 may be incremented by the counter 26, whereas the upper 8 bits are fixed. Hence, as index address "3C" arrives at the pointer RAM 12, address "1F26" identifying a location in the data RAM is accessed by the RAM 28. Counter 26, under the control of controller 30, selectively increments the address in the RAM 28 on each clock pulse to identify successive locations in the data RAM. The result is that the pointer RAM 12 accesses up to 256 successive addresses of locations within data RAM 14. Data on bus 16 is thereupon sequentially written into successive locations "1F26," "1F27", etc., in data RAM 14.

It should be understood that the portion of the pointer address which may be incremented by counter 26 may be any number of the bits of the pointer address. We have chosen to increment 8 of the 16-bit pointer address to divide the data RAM into segments of 256 storage locations ($2^8$). Clearly, if one wished to more finely divide the data RAM into smaller segments, a smaller number of pointer address bits will be incremented. Thus, incrementing the pointer address by counter 26 will successively advance the pointer address through 256 (in the example) successive data RAM locations.

RAM 28 is operable to access data RAM addresses for either the read or write mode. In the write mode, and in the example given, index address "3C" accesses data RAM address "1F26" which is incremented to "1F27". Thereafter, index address "3C" references data RAM "1F27" address, not "1F26". Assume, however, that initially read index address "4E" also accesses data RAM address "1F26". Incrementing the address of a data RAM associated with the index address for write mode will not affect the index address for read mode. As a result, data read off to the 8-bit processor on line 18 may be read from index address "4E" which, is incremented by counter 26 from "1F26" to "1F27", etc. As a result, data may be inputted into successive locations by the write pointer from one direction and at the same time the data in the read pointer may be read to the other direction, independently of the write operation. Hence, data transfer through RAM 8 accommodates the line speed of both sides. By employing the pointer RAM 12 in this manner, RAM 14 "looks" to both sides as a circular buffer containing 128 first-in, first-out registers (FIFOs) allowing for rapid access.

Both pointer RAM 12 and data RAM 14 employ 16-bit lines. A pair of registers 32, 34 at the bus 18 side of the pointer RAM 12 receive the separate 8-bit addresses and process them in pairs as 16-bit addresses for the pointer RAM 12. A pair of registers 36, 38 on the bus 18 side of the data RAM 14 receive the separate 8-bit data words and process them in pairs as 16-bit words for the data RAM 14. The registers 36 and 38 each contain successive 8-bit bytes of data from channel 18 which are concatenated for storage at an individual storage location in RAM 14. Likewise, 16-bit (concatenated) data stored at a storage location in RAM 14 may be read out to registers 36 and 38 and extracted by the equipment connected to channel 18 at the speed of that equipment as separate 8-bit bytes. Registers 32 and 34 perform a similar function for the data addresses in pointer RAM 12 in that 8-bit addresses on channel 18 are successively stored in register 32 and 34 and are concatenated for storage in pointer RAM 12. Preferrably, initialization of the pointers is accomplished from the 16-bit side of the apparatus and controller 30 keeps track of the pointers to determine when data is needed or available by either side. The 8-bit side merely fetches and stores data using the pointers, with the 16-bit side keeping ahead of any wraparound.

FIG. 2 illustrates the environment of RAM 8, in which lead 16 is connected to 16-bit, 8 MHz processor 40 which in turn is connected to data bus 42. A large-scale data processor 44 and memory 46 are connected to bus 42. An 8-bit, 4 MHz processor 48 is connected to lead 18 from RAM 8 and is connected to four-channel buffer 50. Buffer 50 is capable of transferring 4 bytes (messages) each 6 microseconds. Each time a message is transferred from buffer 50 to channel 52, the contents of the buffer locations must be replaced from 8-bit processor 48. Conversely, each time a byte arrives for input to buffer 50 from channel 52, the previous byte must have been removed from the buffer by processor 48. As a result, processor 48 is operating at a high data transfer rate, handling one byte at a time on several channels. On the other hand, 16-bit microprocessor 40 is engaged primarily in the management of large blocks of data on bus 42, both in the processing of data as well in managing the movement of communication from bus 42 to channel 52. As a result, processor 48 is involved in a rapid transfer activity, servicing protocol; interrupts and resolving contention, whereas processor 40 is engaged primarily in a high-management activity. Utilizing RAM 8 to control the movement of data between processors 40 and 48, rapid communication transfer is achieved.

The present invention thus provides a communication interface between units operating at different frequencies and/or different byte size to appear as a plurality of first-in, first-out transfer devices. The apparatus is effective in operation and serves the most complex communications. Although the pointer RAM 12 and data RAM 14 have been described in connection with data transfer, they may also timeshare to other, ordinary purposes, as available.

This invention is not to be limited by the embodiment shown in the drawings and described in the description, which is given by way of example and not of limitation, but only in accordance with the scope of the appended claims.

What is claimed is:

1. Data communication apparatus for transferring data between first and second channels wherein the data format on the first channel is incompatible with the data format on the second channel, said apparatus comprising: index means connected to said first and second channels for receiving and processing index addresses from each of said first and second channels; first memory means having a plurality of first memory locations each containing a memory address, said first memory means being connected to said index means and being responsive to an index address to retrieve a memory address from a first memory location identified by said index address, said first memory means being connected to said first and second channels to receive memory addresses from said first and second channels, said first memory means further including first memory register means connected to said second channel for formatting memory addressing between the address formats of said first and second channels; and second memory means having a plurality of second memory locations, said second memory means being connected to said first and second channels and to said first memory means for storing data from a selected first or second channel at a second memory location selected by the retrieved memory address and for reading data onto a selected first or second channel from a second memory location selected by the retrieved memory address.

2. Apparatus according to claim 1 wherein said index means includes first index register means connected to said first channel to store index addresses from said first channel, second index register means connected to said second channel to store index addresses from said second channel, and third index register means connected to said first and second index register means to selectively store index addresses stored in said first or second index register means.

3. Apparatus according to claim 2 wherein said first memory means includes counter means for successively incrementing the retrieved memory address, whereby a single index address from said third index register means is used to retrieve from said first memory means successive memory addresses corresponding to second memory locations in said second memory means from where data is to be read or to where data is to be written.

4. Apparatus according to claim 3 wherein said second memory means further includes second memory register means connected to said second channel for formatting data between the data formats of said first and second channels.

5. Apparatus according to claim 1 wherein said second memory means further includes second memory register means connected to said second channel for formatting data between the data formats of said first and second channels.

6. Apparatus according to claim 1 wherein said first memory means includes counter means for successively incrementing the retrieved memory address, whereby a single index address from said third index register means is used to retrieve from said first memory means successive memory addresses corresponding to second memory locations in said second memory means from where data is to be read or to where data is to be written.

7. Apparatus according to claim 6 wherein said second memory means further includes second memory register means connected to said second channel for formatting data between the data formats of said first and second channels.

8. Data communication apparatus for transferring data between first and second channels wherein the data format on the first channel is incompatible with the data format on the second channel, said apparatus comprising: index means connected to said first and second channels for receiving and processing index addresses from each of said first and second channels; first memory means having a plurality of first memory locations each containing a memory address, said first memory means being connected to said index means and being responsive to an index address to retrieve a memory address from a first memory location identified by said index address; and second memory means having a plurality of second memory locations, said second memory means being connected to said first and second channels and to said first memory means for storing data from a selected first or second channel at a second memory location selected by the retrieved memory address and for reading data onto a selected first or second channel from a second memory location selected by the retrieved memory address, said second memory means further including second memory register means connected to said second channel for formatting data between the data formats of said first and second channels.

9. Data communication apparatus for transferring data between first and second channels wherein the data on the first channel is formatted in bytes of a first size and the data on the second channel is formatted in bytes of a second size, said second size being smaller than said first size, said apparatus comprising: index means connected to said first and second channels for receiving and processing index addresses from each of said first and second channels; first memory means having a plurality of memory locations each containing a memory address, said first memory means being connected to said index means and responsive to an index address to retrieve a memory address from a first memory location identified by said index address; second memory means having a plurality of second memory locations, said second memory means being connected to said first channel and to said first memory means; and second memory register means connected to said second memory means and to said second channel, said second memory register means formatting data bytes between said first size and said second size, said second memory means being responsive to a retrieved memory address from said first memory means to selectively store data from said first channel or from said second memory register means at a second memory address location identified by said retrieved memory address and being responsive to a retrieved memory address from said first memory means to selectively read data from a second memory location identified by said retrieved memory address to said first channel or to said second memory register means, said memory locations of said second memory means being of a size compatible with data bytes of said first size.

10. Apparatus according to claim 9 wherein said index means includes first index register means connected to said first channel to store index addresses from said first channel, second index register means connected to said second channel to store index addresses from said second channel, and third index register means connected to said first and second index register means to selectively store index addresses stored in said first or second index register means.

11. Apparatus according to claim 10 wherein said first memory means includes counter means for successively incrementing the retrieved memory address, whereby a single index address from said third index register means is used to retrieve from said first memory means successive memory addresses corresponding to second memory locations in said second memory means from where data is to be read or to where data is to be written.

12. Apparatus according to claim 11 wherein said first memory means is connected to said first and second channels to receive memory addresses from said first and second channels, said first memory means further including first memory register means connected to said second channel for formatting memory addressing between the address formats of said first and second channels.

13. Apparatus according to claim 9 wherein said first memory means includes counter means for successively incrementing the retrieved memory address, whereby a single index address from said third index register means is used to retrieve from said first memory means successive memory addresses corresponding to second memory locations in said second memory means from where data is to be read or to where data is to be written.

14. Apparatus according to claim 13 wherein said first memory means is connected to said first and second channels to receive memory addresses from said first and second channels, said first memory means further including first memory register means connected to said second channel for formatting memory addressing between the address formats of said first and second channels.

15. Apparatus according to claim 9 wherein said first memory means is connected to said first and second channels to receive memory addresses from said first and second channels, said first memory means further including first memory register means connected to said second channel for formatting memory addressing between the address formats of said first and second channels.

16. Apparatus according to claims 8 wherein said index means includes first index register means connected to said first channel to store index addresses from said first channel, second index register means connected to said second channel to store index addresses from said second channel, the third index register means connected to said first and second index register means to selectively store index addresses stored in said first or second index register means.

17. Apparatus according to claim 16 wherein said first memory means includes counter means for successively incrementing the retrieved memory address, whereby a single index address from said third index register means is used to retrieve from said first memory successive memory addresses corresponding to memory locations in said second memory means from where data is to be read or to where data is to be written.

18. Apparatus according to claim 8 wherein said first memory means includes counter means for successively incrementing the retrieved memory address, whereby a single index address from said third index register means is used to retrieve from said first memory means successive memory addresses corresponding to memory locations in said second memory means from where data is to be read or to where data is to be written.

* * * * *

UNITED STATES PATENT AND TRADEMARK OFFICE
CERTIFICATE OF CORRECTION

PATENT NO. : 4,878,197
DATED : October 31, 1989
INVENTOR(S) : Nay et al

It is certified that error appears in the above—identified patent and that said Letters Patent is hereby corrected as shown below:

Column 8, line 5 (Claim 17, line 5), after "memory" read -- means --

Signed and Sealed this

Twenty-fifth Day of September, 1990

Attest:

HARRY F. MANBECK, JR.

Attesting Officer

Commissioner of Patents and Trademarks